US012578243B2

(12) United States Patent
Nielsen et al.

(10) Patent No.: US 12,578,243 B2
(45) Date of Patent: Mar. 17, 2026

(54) METHOD OF DESIGNING A BOLTED JOINT

(71) Applicant: R&D Engineering A/S, Hinnerup (DK)

(72) Inventors: Flemming Selmer Nielsen, Hammel (DK); Jesper Stokbæk, Langå (DK); Jens Vestergaard Nybo, Odense M (DK)

(73) Assignee: R&D Engineering A/S, Hinnerup (DK)

( * ) Notice: Subject to any disclaimer, the term of this patent is extended or adjusted under 35 U.S.C. 154(b) by 0 days.

(21) Appl. No.: 18/678,933

(22) Filed: May 30, 2024

(65) Prior Publication Data

US 2024/0402026 A1      Dec. 5, 2024

(30) Foreign Application Priority Data

Jun. 2, 2023    (EP) ...................................... 23177051

(51) Int. Cl.
  *G01L 5/24*          (2006.01)
  *B25B 29/02*        (2006.01)
  *F16B 31/02*        (2006.01)
  *F16B 35/00*        (2006.01)
(52) U.S. Cl.
  CPC ...................................... *G01L 5/24* (2013.01)
(58) Field of Classification Search
  CPC . G01L 5/24; B25B 29/02; F16B 31/02; F16B 35/00
  See application file for complete search history.

(56) References Cited

U.S. PATENT DOCUMENTS

2021/0355766 A1 * 11/2021 Skaarsjoe ................. G01L 5/24

FOREIGN PATENT DOCUMENTS

| WO | WO-2018103805 A1 * | 6/2018 | |
| WO | WO-2020108721 A1 * | 6/2020 | |
| WO | WO-2020117067 A1 * | 6/2020 | ........... B25B 21/002 |

OTHER PUBLICATIONS

Partial European Search Report in corresponding European patent application serial No. 23177051.2 dated Oct. 26, 2023.
Search Report in corresponding European patent application serial No. 23177051.2 dated Jan. 31, 2024.

* cited by examiner

*Primary Examiner* — Bayan Salone
(74) *Attorney, Agent, or Firm* — Steven M. Koehler; Westman, Champlin & Koehler, P.A.

(57) ABSTRACT

The present invention relates to a method of establishing a bolted joint, the method comprising the following steps: selecting a type of bolted joint; determining a target pre-tension level for the selected bolted joint, wherein the target pre-tension level is less than 10% lower than a maximum pre-tension level of the bolted joint, the maximum pre-tension level relating to a pre-tension level that must not be exceeded without compromising the bolted joint; installing the bolted joint, wherein an actual pre-tension level of the bolted joint is measured during the tightening process.

8 Claims, 2 Drawing Sheets

100

100

102 — Select a type of bolted joint

104 — Determine target pre-tension level

106 — Install bolted joint & measure pre-tension level

METHOD OF DESIGNING A BOLTED JOINT

CROSS-REFERENCE TO RELATED APPLICATION

The present application is based on and claims the benefit of European patent application Serial No. 23177051.2, filed Jun. 2, 2023, the content of which is hereby incorporated by reference in its entirety.

BACKGROUND

The present invention relates to a method of establishing a bolted joint. The invention further relates to a method of servicing bolted joints and the use of a bolt elongation measuring device during the tightening process of a bolted joint.

With the increase in size of wind turbines globally, the requirements for critical loads being transferred via bolted connections is ever increasing. This increase in transfer loads to be absorbed by bolted connections has several consequences. For example, the increasing critical loads require larger amounts of material for the bolted joints, which leads to stress on global resources and increases the weight and difficulty in handling such bolt connections. Often, these high loads can only be handled by specifically designed materials, such as exotic steel alloys or the like. Overall, this increases the need for custom-made components to achieve the retention forces required by the bolted joint.

SUMMARY

Aspects of the present invention provide a method of establishing a bolted joint, which may optimize the use of the bolt joints mechanical properties and increases design freedom during the planning phase. The new method shall also reduce the amount of material required for interfacing components, such as bolted joints, and allow the use of standard components, rather than specialized alloys.

According to a first aspect of the present invention, there is provided a method of establishing a bolted joint, said method comprising:

selecting a type of bolted joint;

determining a target pre-tension level for the selected bolted joint, wherein the target pre-tension level is less than 10% lower than a maximum pre-tension level of said bolted joint, said maximum pre-tension level relating to a pre-tension level that must not be exceeded without compromising the bolted joint; and installing the bolted joint, wherein an actual pre-tension level of the bolted joint is measured during the tightening process.

In a bolt joint, the bolt and clamp components of the joint are designed to transfer external tension load through the joint between the parts to be connected. The joint should always be designed such that the clamp load is never overcome by external forces acting to separate the joint.

The clamping force in the joint is defined by the pre-load level. The pre-load level is the axial force in the bolt that is introduced by tightening. In other words, achieving the correct pre-load level is critical for the bolted joints functionality. In general, the pre-load increases with the torque that is used to tighten the bolt joint. However, as is well known, the amount of tensile stress, i.e., the amount of pre-load a bolted connection can withstand is limited. This maximum pre-tension level, also known as the yield, must not be exceeded to not compromise the bolted joint.

When using traditional planning procedures and guidelines for bolted joints, a significant safety margin is applied to ensure that the yield strength, i.e., the maximum pretension level, is not exceeded during the tightening process. In other words, the pre-tension level achieved by the conventionally planned bolt joint is significantly below the yield strength of the bolt, during tightening. This allows for certain tolerances in the applied torque. If the operator applies too much torque, this should still not lead to pretension levels exceeding the yield strength of the bolted joint. Typical margins, which are also known as a "scatter factor" are typically +/−20%. This also means that the target pre-tension level of conventional planning methods uses no more than 70% of a bolted joints potential pre-tension level to allow for inadvertent overtightening of the bolts.

It follows from the above that conventional planning processes do not utilize the full potential of bolted joints, due to the above error margins.

The method of the present invention set out above suggests intentionally decreasing the "scatter factor", i.e., the pre-load tolerances of the bolted connection. In particular, the invention suggests targeting pre-tension levels for bolted joints, which are less than 10% below a maximum pre-tension level (i.e., the yield strength) of the bolted joint. In other words, the method of the present invention uses around 90% or more of the potential retention force available via a bolted joint. This may then also be used to reduce the number of bolts applied to join two parts. Alternatively or additionally, lighter bolts, which are made of more conventional/more abundant materials, may be used to achieve the same retention force as specialist materials when only 70% of the bolts yield is used. Establishing bolted joints in such a way reduces cost and material consumption of bolted connections.

In order to ensure that the maximum pre-tension level is not exceeded, thereby not compromising the bolted joint, despite the lower error margin, the invention suggests measuring an actual/current pre-tension level during the tightening process. The required pre-tension loads may thus be set with a high level of accuracy.

According to another embodiment, the target pre-tension level is about 5% below a maximum pre-tension level of the bolted joint. According to this example, the method of the present invention allows for an even better use of the bolted joints mechanical potential.

According to another embodiment, the target pre-tension level is less than 10%, preferably less than 5%, above a minimum pre-tension level of said bolted joint, said minimum pre-tension level relating to a pre-tension level that must be met to establish the retention force required by the bolted joint. As will be explained in more detail below, the method of the present invention may also intentionally be set to a value that is closer to the minimum pre-tension level required to achieve the clamp force needed. The method of the present invention can thus also be used to reduce the tolerances between the target pre-tension level and the minimum pre-tension level, because under-tightening will be effectively avoided. In other words, the selection process of the present method not only assumes that the bolted joint will be tightened with higher torque but also sizes the bolted joint in such a way that the clamp forces achieved by the level of pre-tension will be closer to the required retention force than traditional planning methods.

According to another embodiment, measuring the actual pre-tension level of the bolted joint includes:

measuring an unloaded length of a bolt in the bolt joint, prior to the tightening process;

measuring a loaded length of the bolt, after the tightening process;

determining the actual pre-tension level based on a difference between the unloaded and the loaded length of the bolt.

According to another embodiment, the method comprises re-tightening the bolted joint, if the actual pretension level is lower than the target-pretension level.

According to another embodiment, the method comprises storing the target pre-tension level and/or the actual pre-tension level achieved after the tightening process. Such stored pre-tension levels may be re-used during maintenance of the bolted connection. In particular, during service of the bolted connection, a measurement device may be used to measure the current pre-tension level, e.g., after the bolted connection has been in use for a certain period of time. The current pre-tension levels may then be compared to the stored target pre-tension level and/or the stored actual pre-tension level that was applied during initial installation of the bolted joint. Any discrepancy between the pre-tensioning values (i.e., due to loosening of the bolted joint) may then be corrected by the operator by re-tightening the bolted joint.

According to another aspect of the present invention, there is provided a method of servicing an existing bolt joint comprising:

measuring a pre-tension level of the bolted joint;

comparing the measured pre-tension level to a stored pre-tension level obtained during an initial tightening process of the bolted joint; and re-tightening the bolted joint such that the measured pre-tension level matches the stored pre-tension level.

Another aspect of the present invention relates to the use of a bolt elongation measuring device during the tightening process of a bolted joint to verify actual pre-tension levels of the bolted joint, wherein the bolt elongation measuring device is configured to apply at least two different length measurements of the bolted joints.

As set out in detail above, the use of a bolt elongation measuring device during the installation process, i.e., during the tightening process of a bolted joint allows for a more effective use of the bolted joints mechanical potential. This is because the bolt elongation measuring device may provide accurate measurements of the actual pre-tension levels, such that over-/under-tightening of the bolted joint can be systematically avoided and the bolted joint, therefor, selected with lower error margins.

According to another embodiment, the elongation measuring device used during the tightening process is configured to:

measure an unloaded length of a bolt in the bolt joint, prior to the tightening process;

measure a loaded length of the bolt, after the tightening process;

determine the actual pre-tension level based on a difference between the unloaded and the loaded length of the bolt.

BRIEF DESCRIPTION OF THE DRAWINGS

The invention shall now be described in more detail with reference to the exemplary embodiments shown in the attached drawings, in which.

DETAILED DESCRIPTION OF ILLUSTRATIVE EMBODIMENTS

Figure 1:
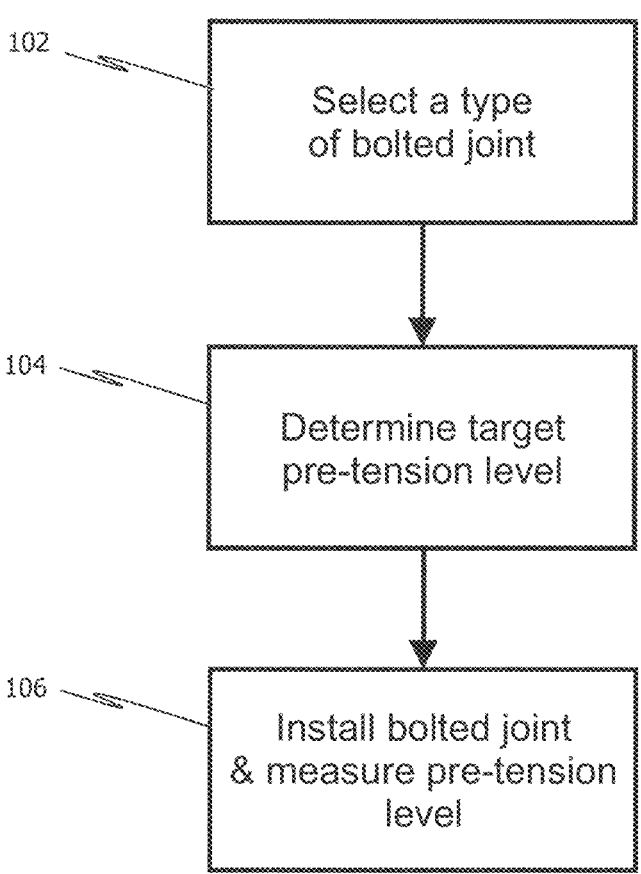
FIG. 1 shows a schematic flow-chart of a method according to the present invention.

FIG. 1 is a schematic flow-chart of an embodiment of the method according to the present invention. The method 100 is used to establish a suitable bolted joint connection, which includes both a planning phase in steps 102, and 104 as well as an installation phase in step 106.

In a first step 102, a type of bolted joint is selected. This most notably includes the selection of the size, shape, material(s), and number of bolts used in the bolted joint. As will be appreciated, each type of bolted joint includes different characteristics, such as the maximum yield strength of the respective bolts, which relates to the maximum pre-tension load discussed above. This type of bolted joint will be selected from a list of suitable bolted joints that may typically be used for the bolted connection in question.

In a second step 104, the method comprises determining a target pre-tension level for the bolted joint. To this end, the required retention force and therefor the required clamp force of the bolted connection is determined. This may be based on the expected static and dynamic loads that will apply to the bolted joint in use. Based on such retention force calculations, the target pre-tension level for the bolted connection may be determined automatically or manually. In this regard, it should be noted that the clamp force of a bolted joint is directly dependent on the pre-tension level established during the tightening process. Such a dependency between the pre-tension level and the clamp force may be derived from a characteristic curve of the selected type of bolted joints or stored in a lookup table that may be used by a processor to determine the pre-tension level required to establish the desired clamp force/retention force.

The target pre-tension level may be determined as 5% below the maximum pre-tension level (the yield strength) or 95% of the maximum pre-tension level. At this stage, the method may also ensure that the target pre-tension level is less than 10% higher than a minimum pre-tension level that must be met to establish the retention force required by the bolted joint. Should a human or processor determine that 95% of the maximum pre-tension level of the selected bolted joint is more than 10% above the minimum pre-tension level required by the bolted joint, the method may return to step 102 and select a different type of bolted joint. The method may re-iterate this process until a type of bolted joint is selected that exhibits no more than 10% tolerance between the minimum pre-tension level and the maximum pre-tension level.

In a third step 106, the bolted joint is installed. During installation, the actual pre-tension level of the bolted joint is measured and set to the target pre-tension level. To this end, the installer may connect a suitable measuring device, such as a bolt elongation measuring device, to the bolted joint and tighten the joint as long as is required to achieve the target pre-tension level.

In some embodiments, measuring the actual pre-tension level includes, measuring an unloaded length of a bolt in the bolt joint, prior to the tightening process and/or prior to the installation process; measuring a loaded length of the bolt, after the tightening process; and determining the actual pre-tension level based on a difference between the unloaded and the loaded length of the bolt.

The unloaded length of the bolt may be measured before the bolted joint is installed, i.e. between the second step 104 and the third step 106. Both the unloaded length and the loaded length may be determined by a variety of known methods, including ultrasound measurements, mechanical measurements, and/or optical measurements.

The difference between the unloaded length and the loaded length of the bolt is directly proportional to the actual pre-tension level within the bolt.

Figure 2:
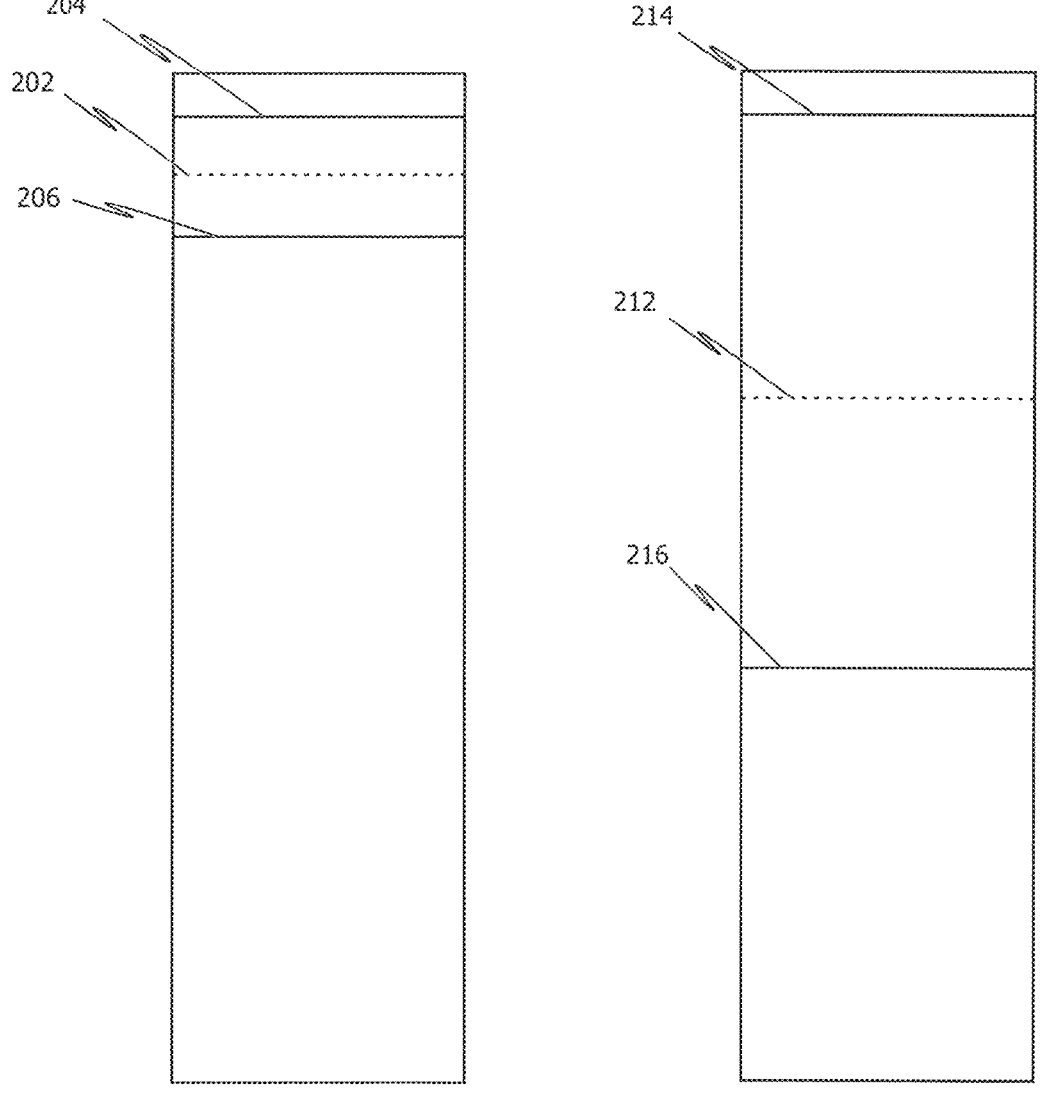
FIG. 2 shows a schematic illustration of the scatter factor applied by the method of the present invention and a conventional, empirical scatter factor applied in the art.

FIG. 2 is a schematic illustration of the pre-tension levels utilized in the method of the present invention (on the left) and in the art (on the right). In both illustrations in FIG. 2, the same type of bolted joint is used. However, according to the method of the present invention, the target pre-tension level 202 is chosen to be significantly higher than the target pre-tension level applied traditionally. In particular, the target pre-tension level 202 is arranged to be less than 10%, for example around 5%, below a maximum pre-tension level 204, which may be defined as the yield strength of the bolted joint. At the same time, the target pre-tension level 202 may be arranged to be less 10%, for example around 5%, above a minimum pre-tension level 206, which is a pre-tension level that must be met to establish the retention force required by the bolted joint. In other words, the target pre-tension level for the bolted joint according to the present invention is chosen to be around 5% of pre-tension levels that would be achieved if the bolted joint was over-tightened (maximum pre-tension level) or under-tightened (minimum pre-tension level).

The above is in contrast to conventional determination of the target pre-tension level 212, which is set to be around 30% below the maximum pre-tension level 214 and around 20% above a minimum pre-tension level 216. This conventional approach is due to the installer applying a torque that may be based on the installer's experience only. Even if a torque wrench is used, the tolerances are high and there is no guarantee that the resulting pre-tension levels will not exceed the yield of the bolt joint. Nor is it guaranteed that the minimum pre-tension will be achieved, even when tightening tools are setup according to specification.

By contrast, the present method suggests measuring the pre-tension level, rather than the torque during the installation process, thereby leading to significantly more accurate determination of the forces introduced into the bolted joint. This information may thus be applied to use most of the bolted joints mechanical potential in that the target pre-tension level may be chosen comparatively close to the minimum level required for the clamp force and the maximum level that would result in potential breakage of the bolted joint.

The present disclosure is not limited to the embodiments described in the FIGs. but may include a combination of the features disclosed therein.

Although the present invention has been described with reference to preferred embodiments, workers skilled in the art will recognize that changes may be made in form and detail without departing from the spirit and scope of the invention.

What is claimed is:

1. A method of servicing an existing bolted joint comprising:

measuring a pre-tension level of the bolted joint;

comparing the measured pre-tension level to a stored pre-tension level obtained during an initial tightening process of the bolted joint, wherein the stored pre-tension level is less than 10% lower than a maximum pre-tension level of the bolted joint, the maximum pre-tension level relating to a pre-tension level that must not be exceeded without compromising the bolted joint; and re-tightening the bolted joint such that the measured pre-tension level matches the stored pre-tension level.

2. A method of using a bolt elongation measuring device during a tightening process of a bolted joint to verify actual pre-tension levels of the bolted joint, wherein a final pre-tension level is less than 10% lower than a maximum pre-tension level of the bolted joint, the maximum pre-tension level relating to a pre-tension level that must not be exceeded without compromising the bolted joint, wherein the bolt elongation measuring device is configured to apply at least two different length measurements of the bolted joint.

3. The method of claim 2, wherein the elongation measuring device is configured to:

measure an unloaded length of a bolt in the bolted joint, prior to the tightening process;

measure a loaded length of the bolt, after the tightening process; and determine the actual pre-tension level based on a difference between the unloaded and the loaded length of the bolt, wherein the actual pre-tension level is less than 10% lower than a maximum pre-tension level of the bolted joint, the maximum pre-tension level relating to a pre-tension level that must not be exceeded without compromising the bolted joint.

4. The method of claim 3 and further comprising:

determining a target pre-tension level for the selected bolted joint, wherein the target pre-tension level is less than 10% lower than a maximum pre-tension level of the bolted joint.

5. The method of claim 3 and further comprising:

re-tightening the bolted joint, if the actual pretension level is lower than the target-pretension level.

6. The method of claim 5 and further comprising:

storing the target pre-tension level and/or the actual pre-tension level achieved after the tightening process.

7. The method of claim 4 and further comprising:

storing the target pre-tension level and/or the actual pre-tension level achieved after the tightening process.

8. The method of claim 4, wherein the target pre-tension level is about 5% below a maximum pre-tension level of the bolted joint.

* * * * *